UNITED STATES PATENT OFFICE.

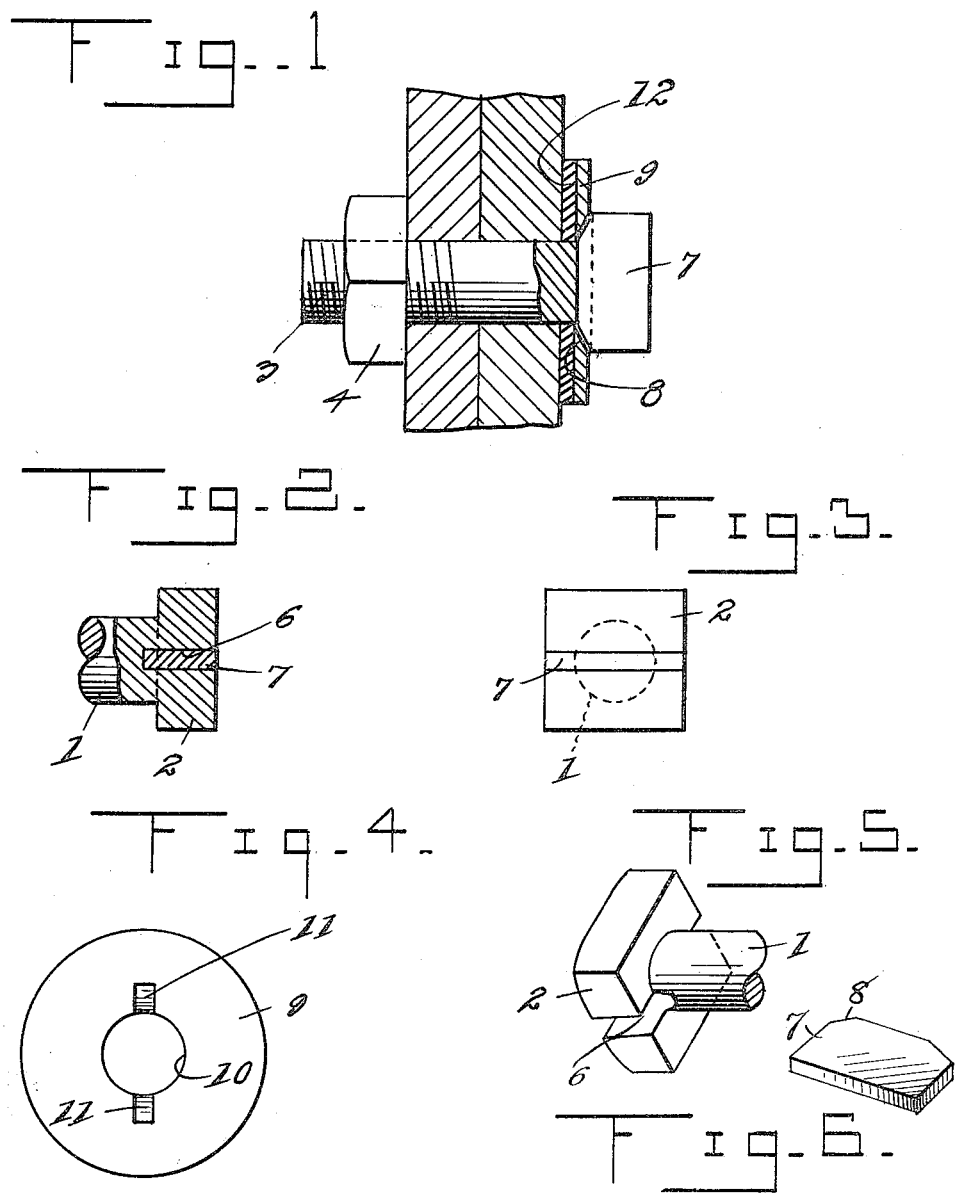

WILLIAM H. A. BOON, OF SAN DIMAS, CALIFORNIA.

BOLT-LOCK.

1,137,569.   Specification of Letters Patent.   Patented Apr. 27, 1915.

Application filed November 19, 1913. Serial No. 801,940.

*To all whom it may concern:*

Be it known that I, WILLIAM H. A. BOON, a citizen of the United States, residing at San Dimas, in the county of Los Angeles and State of California, have invented certain new and useful Improvements in Bolt-Locks; and I do hereby declare the following to be a full, clear, and exact description of the invention, such as will enable others skilled in the art to which it appertains to make and use the same.

This invention relates to new and useful improvements in bolt locks and has for its object the provision of a device which will effectively lock a bolt against rotation.

Another object of my invention is the provision of a device which may be used on railway fish plates, or any place where it is desired that the nut or bolt be held from rotation.

With the above and other objects in view I will now proceed to describe my invention in the following specification and accompanying drawings, in which, Figure 1 is a view of my improved bolt lock showing the same as it would appear when in use the bolt being shown partly in section, Fig. 2 is a detail view of the head of the bolt showing the same partly in section, Fig. 3 is a plan view of the head of the bolt constructed in accordance with my improved invention. Fig. 4 is a plan view of the washer which coöperates with the bolt. Fig. 5 is a fragmental perspective view of the bolt, and Fig. 6 is a perspective view of the key.

Referring to the drawings by characters of reference 1 indicates a bolt of the usual construction which is provided at one end with the usual head 2 and at its opposite end with the screw thread 3, with which the nut 4, having internally screw threaded aperture 5 is adapted to coöperate.

The bolt 1 having the head 2 thereon is provided with the screw threads 3. The locking member 7 is provided with the beveled faces 8 which taper from the end of the bolt head inwardly toward the shank of the bolt as clearly illustrated in Fig. 1.

The washer which is used in conjunction with my invention and is illustrated in Fig. 4 is indicated generally by the numeral 9. This washer is also provided with the centrally located aperture 10, having the beveled recesses 11, formed therein, which are so constructed that they coöperate with the beveled faces 8 formed on the member 7 and lock the bolt from rotation when the device is in use. Intermediate the washer 9 and the work which is to be clamped by the bolt I preferably provide a rubber washer 12 which is adapted to frictionally engage the washer 9 and the surface of the work and prevent the washer 9 from turning when the device is in use. Furthermore, it will be seen that the washer 12 will render the washer 9 more or less resilient and materially assist the operator in using the device.

In use it will be apparent that the bolt is placed through the apertures in the work to be clamped with the washer having the recesses therein facing the inside of the bolt head and a suitable rubber washer interposed between the washer 9 and the work, the washer is then put in place and the nut then placed next to the work and it will be apparent that upon tightening upon the nut the washer will be frictionally engaged and when the portion 7 or 8, such as the case might be come into registration with the recesses 11 the same will extend into the recesses and prevent rotation of the nut with relation to the washer.

While in the foregoing I have shown and described the preferred embodiment of my invention I wish it to be understood that I may change the specific combination and arrangement of parts without in any way departing from the spirit and scope of the invention as defined in the appended claim.

What is claimed is:—

A bolt lock including a bolt comprising a shank, a head formed at one end of the shank, threads formed at the opposite end of the shank, the head of said bolt being provided with a longitudinal slot, a strip of metal inserted within said slot and extending through and projecting out of the under surface of said head, its ends being beveled and the inner end engaging the bolt shank, and a washer having transverse recesses fitting up against the under face of said head, and the beveled portions of the metal strip seating within the recesses of said washer to hold the bolt and washer against relative movement.

In testimony whereof I affix my signature in presence of two witnesses.

WILLIAM H. A. BOON.

Witnesses:
O. W. HOKE,
F. H. TAYLOR.

Copies of this patent may be obtained for five cents each, by addressing the "Commissioner of Patents, Washington, D. C."